April 19, 1949.　　　R. D. ACTON　　　2,467,717
TRACTOR-MOUNTED PICKUP BALER
Filed May 27, 1944
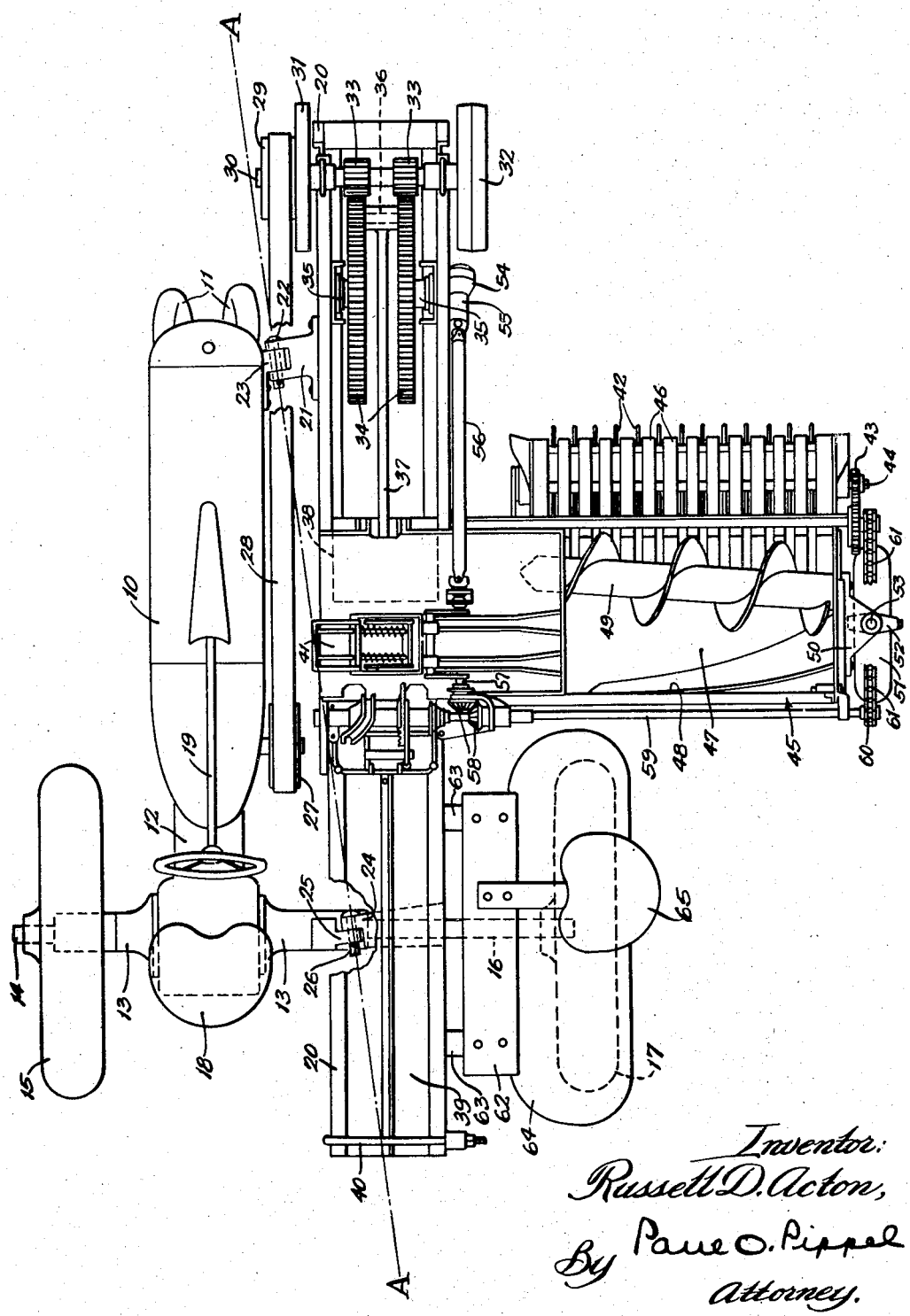

Patented Apr. 19, 1949

2,467,717

UNITED STATES PATENT OFFICE 2,467,717

TRACTOR-MOUNTED PICKUP BALER

Russel D. Acton, Chicago, Ill., assignor to International Harvester Company, a corporation of New Jersey Application May 27, 1944, Serial No. 537,746

20 Claims. (Cl. 100—19)

This invention relates to a tractor-mounted pick-up baler.

The trend in the development of farm machines has been to provide implements which can be directly mounted on a tractor of a type which can be used for general farm use. Cultivators and tillage tools have been supplied for many years which attach directly to the tractor, thereby eliminating a large portion of a wheel frame structure normally used for an implement and providing a self-propelled implement which can be readily maneuvered with many advantages. Another trend in the development of farm machines is the pick-up baler—that is, a baler which is drawn across the field and which picks up material to be baled from a windrow feeding it directly into a baling chamber without manual assistance.

The principal object of the present invention is to detachably mount a pick-up baler on a general purpose tractor.

Another object is to provide a hinge or floating connection of a baler with respect to a tractor, whereby flexibility is obtained for following uneven ground contours.

Another object is to provide a simplified pivot hinge arranged to support the baler generally at two desirable points on the tractor, one at the front of the tractor and the other on the rear axle structure.

Another object is to locate a mounted pick-up baler on a tractor in a position whereby the operator may observe both the windrow being picked up and the baling mechanism, particularly that portion which has to do with the tying of the bales.

Another object is to provide an operator's station for assisting in the tying operation.

The above objects, which will be apparent from the detailed description to follow, are attained by a construction such as shown in the drawings, the single figure illustrating a pick-up baler mounted on a tricycle type of tractor.

The tractor illustrated is generally of the conventional tricycle type having a narrow body 10, a front steerable support consisting of closely spaced wheels 11, a rear body portion 12, and rear axle structures 13 extending laterally from the body portion 12. A short axle 14 extends from one housing structure 13 supporting a traction wheel 15. A relatively long axle 16 extends from the other housing 13, a traction wheel 17 being mounted at the outer end thereof. An operator's seat 18 and a steering mechanism 19 are diagrammatically illustrated in proper position on the tractor. By providing the long axle 16, the traction wheel 17 may be spaced from the narrow body of the tractor to provide a space of sufficient lateral extent for mounting an implement such as the baler illustrated.

The baler, as shown in the drawing, is of a type now being widely used for picking up hay directly from windrows in the field. Such balers are mounted on their own wheeled supports and pulled behind a tractor, as shown in application Serial No. 466,460, filed November 21, 1942, which issued on September 28, 1948, as Patent No. 2,450,082. Said application also shows details of an automatic tying mechanism which passes strands around the bales and makes the tie, therefore eliminating the extra operator required for tying the bale tires. Said application also shows details of a plunger type of baler having a pick-up device, means for feeding the material picked up to a feed chamber, and means for assisting in providing the ties for tying the bales. As the invention disclosed herein is concerned only with the mounting of a pick-up baler on a tractor to be supported and propelled thereby, the various details of the baler mechanism have not been shown, and only the basic units thereof will be referred to and described.

The baler, as illustrated, has a longitudinal frame structure consisting essentially of frame members 20 extending longitudinally of the tractor body from a point rearwardly of the rear axle to a location forwardly of the front of the tractor. Said members, together with suitable interconnecting frame members, constitute a rigid frame structure which is pivotally connected to the tractor on an inclined axis indicated by the dot-dash line A—A.

To represent the hinged or pivotal connection of the baler frame structure with the tractor, a bracket 21 connected to one side of the baler frame structure near its forward end extends laterally to a point adjacent the body 12 of the tractor, being pivotally connected by hinge pin 22 with a bracket 23 rigidly secured to the tractor. At the rear end of the baler frame structure, a bracket 24 secured to the lower portion of the frame structure is hinged or pivoted to a bracket 25 secured to the axle structure 13 by a pivot pin 26. The pins 22 and 26 are on the pivot axis A—A and determine this axis. The inclination of the axis permits providing a pivot point at the front close to the tractor body and as near to the supporting wheels 11 as possible. The independent pivot at the rear is spaced outwardly to carry the baler weight as far out on the axle housing 13 as possible, whereby a large portion of the baler weight is carried on the laterally spaced traction wheel 17. This construction provides for substantially the same amount of weight on the two traction wheels 15 and 17.

A power take-off pulley 27 at the side of the tractor is connected by a belt 28 with a drive pulley 29 mounted on a shaft 30. Said pulley 29 may be a portion of a fly-wheel 31 which, with a fly-wheel 32 at the other end of the shaft 30, provides an inertia build-up device for operating the baling plunger. A pair of spaced gears 33 on the shaft 30 engages and drives a pair of large gears 34 mounted on stub shafts 35 which extend outwardly through the sides of the baler frame structure being suitably journaled therein. A crank pin 36 connecting the two gears 34 is engaged by the head of a connecting rod or plunger drive member 37, which is pivotally connected at its other end to a plunger 38 as indicated in dotted lines. Said plunger is reciprocated by the mechanism described to alternately compress material to be baled and to withdraw for the feeding of additional material.

At the rear end of the baler frame structure, a baling chamber 39 is provided, tension-varying means 40 being illustrated at the rear end of the baling chamber. Intermediate the baling chamber 39 and the plunger and its drive mechanism, a chamber 41 provides space for the introduction of material to be baled.

A conventional pick-up mechanism, consisting of tines 42 carried by a conventional rotating structure which is driven by suitable mechanism—for example, as by a sprocket 43 on a shaft 44, is mounted laterally of the main frame structure of the baler and forwardly of the traction wheel 17. Said pick-up device is carried by a laterally extending frame structure designated in its entirety by the reference character 45. Said frame structure is a rigid extension part of the main frame structure and is suitably and rigidly secured to the frame members 20. Between the tines 42, which are moved upwardly and rearwardly to pick up material to be baled, a plurality of sheet metal members 46 provide for delivering the material onto a feed table 47, which is the bottom of a material-receiving means which also has a back wall 48. Said construction is shown in detail in the application previously referred to. A conveying auger 49 is mounted and driven to deliver material axially thereof along the feeding table toward the receiving chamber 41. Suitable mechanism of a conventional nature is provided for feeding material into the receiving chamber 41. The material is then compressed by the plunger 38 into the bale chamber, after which suitable length bales are provided by a block mechanism or by automatic tying means and needles for feeding tying strands through the bale chamber, as shown in the application previously referred to.

At the outer end of the laterally extending auxiliary frame structure 45, a bracket 50 provides means for supporting a castering wheel 51. Said wheel is straddle-mounted by a supporting bracket 52 which has a vertical spindle 53 pivoted in the bracket 50. Only a limited amount of castering action is required for said wheel as it is only a short distance forwardly of the center line of the rear traction wheels. The amount necessary for said wheels to turn will be less than half the angular turning of the front wheels 11. The wheel 51 supports the outer end of the laterally extending frame structure 45 for floating movement with respect to the tractor, said ground engaging wheel serving as a gauging means for the pick-up device when the baler is moving on level ground. Certain portions of a drive mechanism are illustrated. A housing 54 into which one of the stub shafts 35 extends, contains gearing for transferring motion to a right angle shaft 55 which is connected by universal joints and a shaft 56 to a drive shaft 57. Said shaft by a set of bevel gears 58 drives a shaft 59 extending laterally along the rear of the auxiliary frame structure 45. Said shaft, by means of a sprocket 60, drives a chain 61 which in turn drives the sprocket 43, previously referred to.

A platform 62 is shown connected by brackets 63 to the frame structure of the baler at one side of the bale chamber 39. A fender 64 connected to the platform 62 extends over the traction wheel 17 to shield the operator against contact with the wheel. A seat 65 mounted over the fender and over the traction wheel provides a station for an operator. Said operator may bunch wires and tie them as in a conventional baler, may tie the wires together in a semi-automatic baler, or may merely observe the operation of the baling mechanism in a fully automatic baler. With a fully automatic baler of any type which will tie the bales without manual assistance, it is not necessary to have a second operator, and the operator's station and platform may be dispensed with, whereby the traction wheel 17 may be moved in closely adjacent to the frame structure of the baler. In that event, the operator of the tractor is located in a position to observe the tying mechanism, which will be directly in his line of vision, while observing the windrow being picked up. This is an outstanding feature of applicant's invention and is a very significant one as it is highly desirable that any irregularity in operation of the feeding or tying mechanism of the baler be quickly observed by the tractor operator to avert damage to the machine and to avert the formation of untied bales.

It is to be understood that applicant has shown only in a diagrammatic form the mechanism of a baler construction, and that only a preferred embodiment of directly mounting a baler on a tractor in a particular location with respect thereto has been illustrated. All modifications falling within the scope of the appended claims are contemplated as applicant's invention.

What is claimed is:

1. A tractor-mounted pick-up baler construction comprising in combination with a tractor having a longitudinal body, a front rolling support and an extended rear axle structure at one side thereof, a baler frame structure extending lengthwise of the tractor along the tractor body at the extended axle structure side, means for connecting said frame structure to the tractor on longitudinally spaced locations, a plunger chamber and driving mechanism therefor provided at one end of the frame structure, a bale chamber provided at the other end of the frame structure, a material-receiving chamber between the bale chamber and the plunger chamber, a laterally-extending frame portion connected at its inner end to said baler frame structure, a supporting means mounted at the outer end of said frame portion, a pick-up device carried by said frame portion, and a material-transferring means mounted on the frame portion and operative to deliver material from the outer end towards the material-receiving chamber.

2. A tractor-mounted pick-up baler construction comprising in combination with a tractor having a narrow body, a narrow front rolling support and an extended rear axle structure at one side thereof, a baler frame structure extending lengthwise of the tractor along the tractor body forwardly thereof and over the rear axle structure, means for connecting said frame structure to the tractor on longitudinally spaced locations, a plunger chamber and driving mechanism therefor provided on said frame structure, a bale chamber provided on the frame structure, a material-receiving chamber between the bale chamber and the plunger chamber, a laterally-extending frame portion rigid with respect to the frame structure, a supporting caster wheel mounted at the outer end of said frame portion, a pick-up device carried by said frame portion, and a material-transferring means mounted on the frame portion and operative to deliver material from the outer end to the inner end adjacent the material-receiving chamber, platform means between the bale chamber and the wheel at that side for an operator, a fender extending over the wheel from said platform, and means for seating an operator over said fender.

3. A tractor-mounted pick-up baler construction comprising in combination with a tractor having a narrow body, a narrow front rolling support and an extended rear axle structure at one side thereof, a baler frame structure extending lengthwise of the tractor along the tractor body forwardly thereof and over the rear axle structure, means for connecting said frame structure to the tractor on longitudinally spaced locations, a plunger chamber and driving mechanism therefor provided on the forward portion of said frame structure, a bale chamber provided at the rear of the frame structure and over the rear axle structure, a material-receiving chamber between the bale chamber and the plunger chamber, a laterally-extending frame portion rigid with respect to the frame structure, a pick-up device carried by said frame portion and adapted to operate adjacent the ground for gathering material to be baled therefrom during travel of the machine, and a material-transferring means mounted on the frame portion and operative to deliver material from the outer end to the inner end adjacent the material-receiving chamber.

4. A tractor-mounted pick-up baler construction comprising in combination with a tractor having a narrow body, a narrow front rolling support and an extended rear axle structure at one side thereof, a baler frame structure extending lengthwise of the tractor along the tractor body forwardly thereof and over the rear axle structure, means for connecting said frame structure to the tractor on longitudinally spaced locations, a plunger chamber and driving mechanism therefor provided on the forward portion of said frame structure, a bale chamber provided at the rear of the frame structure and over the rear axle structure, a material-receiving chamber between the bale chamber and the plunger chamber, a laterally-extending frame portion rigid with respect to the frame structure, a supporting caster wheel mounted at the outer end of said frame portion, a pick-up device carried by said frame portion, and a material-transferring means mounted on the frame portion and operative to deliver material from the outer end to the inner end adjacent the material-receiving chamber, platform means between the bale chamber and the wheel at that side for an operator, a fender extending over the wheel from said platform, and means for seating an operator over said fender.

5. A device as set forth in claim 1 in which the frame structure is pivoted to the tractor on an axis extending in a direction generally lengthwise of the tractor.

6. A device as set forth in claim 1 in which the frame structure is pivoted to the tractor at two longitudinal spaced locations, one pivot being adjacent the front of the tractor body and the other pivot being on the extended axle structure.

7. A device as set forth in claim 1 in which the frame structure is pivoted to the tractor at two longitudinal spaced locations, one pivot being adjacent the front of the tractor body and the other pivot being on the extended axle structure and spaced outwardly with respect to the forward pivot.

8. A device as set forth in claim 1 in which the frame structure is pivoted to the tractor on an axis inclined with respect to the longitudinal center line of the tractor.

9. A tractor-mounted pick-up baler construction comprising in combination with a tractor having a narrow body, a narrow front rolling support, an extended axle structure at the rear thereof and an operator's station adjacent the rear of the tractor, a baler frame structure extending lengthwise of the tractor along the central body forwardly thereof and over the rear axle structure, means for connecting said frame structure to the tractor on longitudinally spaced locations, a plunger chamber and driving mechanism therefor provided on the forward portion of said frame structure, a bale chamber provided at the rear of the frame structure over the rear axle structure and adjacent the operator's station, a material-receiving chamber between the bale chamber and the plunger chamber, a frame portion laterally extending from the frame structure ahead of the extended axle structure, a supporting wheel mounted at the outer end of said frame portion, a pick-up device carried by said frame portion, and material-transferring means mounted on the frame portion and operative to deliver material from the outer end to the inner end adjacent the material-receiving chamber.

10. A device as set forth in claim 9 in which the frame structure is pivoted to the tractor at two longitudinal spaced locations, one pivot being adjacent the front of the tractor body and the other being on the extended axle structure.

11. A device as set forth in claim 9 in which the frame structure is pivoted to the tractor on an axis extending in a direction generally lengthwise of the tractor.

12. A device as set forth in claim 9 in which the frame structure is pivoted to the tractor at two longitudinal spaced locations, one pivot being adjacent the front of the tractor body and the other pivot being on the extended axle structure and spaced outwardly with respect to the forward pivot.

13. A tractor-mounted pick-up baler construction comprising in combination with a tractor having a narrow body, a narrow front rolling support, an extended axle structure at the rear end thereof and an operator's station adjacent the rear of the tractor, a baler frame structure extending lengthwise of the tractor along the central body forwardly thereof and over the rear axle structure, means for connecting said frame structure to the tractor on longitudinally spaced locations, a plunger chamber and driving mechanism therefor provided on the forward portion of said frame structure, a bale chamber provided at the rear of the frame structure over the rear axle structure and adjacent the operator's station, a material-receiving chamber between the bale chamber and the plunger chamber, a frame portion laterally extending from the frame structure ahead of the extended axle structure, a supporting wheel mounted at the outer end of said frame portion, a pick-up device carried by said frame portion, and material-transferring means mounted on the frame portion and operative to deliver material from the outer end to the inner end adjacent the material-receiving chamber, platform means between the bale chamber and the wheel at that side for an operator, a fender extending over the wheel from said platform, and means for seating an operator over said fender 14. A tractor-mounted pick-up baler construction comprising in combination with a tractor having a narrow body, a narrow front rolling support, an axle structure at the rear of the tractor and extended at one side thereof and traction wheels on said axle structure, a baler frame structure extending lengthwise of the tractor along the tractor body between the widely spaced traction wheel and the body and beyond said extended rear axle structure, said frame structure being connected to the tractor at two longitudinally spaced points, driving mechanism and a plunger chamber provided at one end portion of said frame structure, a bale chamber provided at the other end portion of the frame structure, a material-receiving chamber on the frame structure intermediate said first named chambers and intermediate the front and rear of the tractor and spaced in the direction of the front of the tractor beyond the traction wheel at the extended axle structure side of the tractor, a laterally-extending frame portion connected to the frame structure and extending laterally therefrom and spaced from the traction wheel at the extended axle structure side of the tractor, a pick-up mechanism carried on said frame portion, means for floatingly mounting said pick-up mechanism with respect to the tractor, and a material-transferring means mounted on said frame portion and operative to deliver material laterally therefrom to a location adjacent the material-receiving chamber.

15. A tractor-mounted pick-up baler construction comprising in combination with a tractor having a narrow body, a narrow front rolling support, an axle structure at the rear of the tractor and extended at one side thereof and traction wheels on said axle structure, a baler frame structure extending lengthwise of the tractor along the tractor body between the widely spaced traction wheel and the body and beyond said extended rear axle structure, said frame structure being connected to the tractor at two longitudinally spaced points, driving mechanism and a plunger chamber provided at one end portion of said frame structure, a bale chamber provided at the other end portion of the frame structure, a material-receiving chamber on the frame structure intermediate said first named chambers and intermediate the front and rear of the tractor and spaced in the direction of the front of the tractor beyond the traction wheel at the extended axle structure side of the tractor, a laterally-extending frame portion connected to the frame structure and extending laterally therefrom and spaced from the traction wheel at the extended axle structure side of the tractor, a pick-up mechanism carried on said frame portion, ground-engaging and gauging means carried by said frame portion, said frame portion being floatingly mounted with respect to the tractor, and a material-transferring means mounted on said frame portion and operative to deliver material laterally therefrom to a location adjacent the material-receiving chamber.

16. A tractor-mounted pick-up baler construction comprising in combination with a tractor having a narrow body, a narrow front rolling support, an axle structure at the rear extended at one side of the tractor and traction wheels on said axle structure, a baler frame structure extending lengthwise of the tractor along the tractor body between the widely spaced traction wheel and the body and over and beyond said extended rear axle structure, said frame being connected to the tractor; driving mechanism and a plunger chamber provided at the end portion of said frame structure adjacent the front of the tractor, a bale chamber provided at the end portion of the frame structure extending over the rear axle structure, a material-receiving chamber on the frame structure intermediate the front and rear of the tractor and spaced in the direction of the front of the tractor longitudinally in a forward direction beyond the traction wheel at the extended axle structure side of the tractor, a laterally-extending frame portion connected to the frame structure and extending laterally therefrom and spaced forwardly from the traction wheel at the extended axle structure side of the tractor, a pick-up mechanism carried on said frame portion, ground-engaging and gauging means carried by said frame portion, said frame portion being floatingly mounted with respect to the tractor, and a material-transferring means mounted on said frame portion and operative to deliver material laterally therefrom to a location adjacent the material-receiving chamber.

17. A tractor-mounted pick-up baler construction comprising in combination with a tractor having a narrow body, a narrow front rolling support, an extended axle structure at the rear at one side of the tractor and traction wheels on said axle structure, a baler frame structure extending lengthwise of the tractor along the tractor body between the widely spaced traction wheel and the body and beyond said extended rear axle structure, said frame structure being pivotally connected to the tractor at longitudinally spaced points, driving mechanism and a plunger chamber provided at one end portion of the frame structure, a bale chamber provided at the other end portion of the frame structure, a material-receiving chamber on the frame structure intermediate the front and rear of the tractor and spaced in the direction of the front of the tractor beyond the traction wheel at the extended axle structure side of the tractor, a laterally-extending frame portion rigidly connected to the frame structure and extending laterally therefrom and spaced from the traction wheel at the extended axle structure side of the tractor, a pick-up mechanism carried on said frame portion, wheeled supporting means at the outer end of said frame portion, and a material-transferring means mounted on said frame portion and operative to deliver material laterally therefrom to a location adjacent the material-receiving chamber.

18. A tractor mounted pick-up baler construction comprising in combination with a tractor having a longitudinal body, a front rolling support and an extended rear axle structure at one side thereof, a baler frame structure extending lengthwise of the tractor along the tractor body at the extended axle structure side, means for connecting said frame structure to the tractor, a plunger chamber and driving mechanism therefor provided on the frame structure at one end thereof, a bale chamber provided at the other end of the frame structure, a material receiving chamber between the bale chamber and the plunger chamber, a laterally extending frame portion connected to said baler frame structure, a pick-up device carried by said frame portion, and material transferring means mounted on the frame portion for delivering material from the outer end thereof to the material receiving chamber.

19. A tractor mounted pick-up baler construction comprising in combination with a tractor having a longitudinal body, a front rolling support and an extended rear axle structure at one side thereof, a baler frame structure extending lengthwise of the tractor along the tractor body at the extended axle structure side, means for connecting said frame structure to the tractor, a plunger chamber and driving mechanism therefor provided on the frame structure at the rolling support end thereof, a bale chamber provided at the other end of the frame structure adjacent the axle structure of the tractor, a material receiving chamber between the bale chamber and the plunger chamber, a laterally extending frame portion connected at its inner end to said baler frame structure, a pick-up device carried by said frame portion forwardly of the material receiving chamber, and material transferring means mounted on the frame portion for delivering material from the outer end thereof to the material receiving chamber.

20. A tractor mounted pick-up baler construction comprising in combination with a tractor having a longitudinal body, a front rolling support and an extended rear axle structure at one side thereof, an operator's station at the rear of the body, a baler frame structure extending lengthwise of the tratcor along the tractor body at the extended axle structure side, means for connecting said frame structure to the tractor, a plunger chamber and driving mechanism therefor provided on the frame structure at the rolling support end thereof, a bale chamber provided at the other end of the frame structure adjacent the axle structure of the tractor, a material receiving chamber between the bale chamber and the plunger chamber, tying mechanism associated with said material receiving chamber and positioned thereabove, a laterally extending frame portion connected at its inner end to said baler frame structure, a pick-up device carried by said frame portion forwardly of the material receiving chamber, and material transferring means mounted on the frame portion for delivering material from the outer end thereof to the material receiving chamber, said tying mechanism and said pick-up device being substantially on a diagonal line extending forwardly and outwardly from the operator's station whereby an operator on said station may simultaneously observe the functioning of the tying mechanism and the operation of the pick-up device.

RUSSEL D. ACTON.

REFERENCES CITED

The following references are of record in the file of this patent:

UNITED STATES PATENTS

| Number | Name | Date |
| --- | --- | --- |
| 1,504,516 | Schmechel et al. | Aug. 12, 1924 |
| 1,755,524 | Stanfield | Apr. 22, 1930 |
| 2,259,892 | Hyman | Oct. 21, 1941 |
| 2,262,876 | Baker et al. | Nov. 18, 1941 |
| 2,294,440 | Barker | Sept. 1, 1942 |